US012683518B2

(12) United States Patent
Pieschel

(10) Patent No.: US 12,683,518 B2
(45) Date of Patent: Jul. 14, 2026

(54) ASSEMBLY HAVING A MULTILEVEL CONVERTER

(71) Applicant: Siemens Energy Global GmbH & Co. KG, Munich (DE)

(72) Inventor: Martin Pieschel, Altdorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 226 days.

(21) Appl. No.: 18/733,936

(22) Filed: Jun. 5, 2024

(65) Prior Publication Data

US 2024/0405555 A1      Dec. 5, 2024

(30) Foreign Application Priority Data

Jun. 5, 2023    (EP) ..................................... 23177244

(51) Int. Cl.
    *H02M 7/48*        (2007.01)
    *H02J 3/1857*      (2026.01)
    *H02M 7/00*        (2006.01)
    *H02M 7/483*       (2007.01)

(52) U.S. Cl.
    CPC ......... *H02M 7/4835* (2021.05); *H02J 3/1857* (2013.01); *H02M 7/003* (2013.01)

(58) Field of Classification Search
    CPC ..... H02M 7/4835; H02M 7/003; H02J 3/1857
    See application file for complete search history.

(56) References Cited

U.S. PATENT DOCUMENTS

| | | | |
|---|---|---|---|
| 2011/0013441 A1* | 1/2011 | Gruber ................... | H02M 7/49 |
| | | | 323/311 |
| 2013/0070495 A1 | 3/2013 | Jonsson et al. | |
| 2016/0141963 A1* | 5/2016 | Bakran ................. | H02M 3/156 |
| | | | 363/21.01 |
| 2020/0106384 A1* | 4/2020 | Postiglione ............. | H02J 3/381 |

FOREIGN PATENT DOCUMENTS

| | | |
|---|---|---|
| DE | 10103031 A1 | 7/2002 |
| EP | 3231053 B1 | 7/2019 |

* cited by examiner

*Primary Examiner* — Lakaisha Jackson
(74) *Attorney, Agent, or Firm* — Laurence A. Greenberg; Werner H. Stemer; Ralph E. Locher

(57)                   ABSTRACT

An assembly has a multilevel converter for outputting reactive power to a power supply network. The multilevel converter contains three module branches arranged in a delta circuit. Each module branch contains a plurality of submodules in an electrical series circuit. Each module branch contains a first group of the submodules and a second group of the submodules. The submodules of the first group each contain a first electrical energy storage unit, a first electronic switching element and a second electronic switching element. The first electronic switching element and the second electronic switching element are arranged so that the first electrical energy storage unit is connected into the series circuit at a first polarity.

17 Claims, 7 Drawing Sheets

Power Semiconductor
Circuit

ASSEMBLY HAVING A MULTILEVEL CONVERTER

CROSS-REFERENCE TO RELATED APPLICATION

This application claims the priority, under 35 U.S.C. § 119, of European Patent Application EP 23177244.3, filed Jun. 5, 2023; the prior application is herewith incorporated by reference in its entirety.

FIELD AND BACKGROUND OF THE INVENTION

The invention relates to an assembly having a multilevel converter for outputting reactive power to a power supply network and to a method for outputting reactive power to a power supply network.

Electrical power supply networks require reactive power in order to function properly. Reactive power used to be provided mainly by large power plants. In the course of the energy revolution, large central power plants are increasingly being replaced by decentralized power generation plants, for example by wind turbines or photovoltaic plants. However, there is still a need for reactive power.

SUMMARY OF THE INVENTION

The invention is based on the object of specifying an assembly and a method with which reactive power can be output to a power supply network.

This object is achieved according to the invention by an assembly and by a method according to the independent patent claims. Advantageous embodiments of the assembly and the method are specified in the dependent patent claims.

An assembly having a multilevel converter for outputting reactive power to an electrical power supply network is disclosed, wherein:

the multilevel converter contains three module branches arranged in a delta circuit, each module branch contains a plurality of submodules in an electrical series circuit, each module branch contains a first group of the submodules and a second group of the submodules, wherein the submodules of the first group each comprise a first (unipolar) electrical energy storage unit, a first electronic switching element and a second electronic switching element, wherein the first electronic switching element and the second electronic switching element are arranged so that the first electrical energy storage unit can be connected into the series circuit (only) at a first polarity, the submodules of the second group each comprise a second (unipolar) electrical energy storage unit, a third electronic switching element and a fourth electronic switching element, wherein the third electronic switching element and the fourth electronic switching element are arranged so that the second electrical energy storage unit can be connected into the series circuit (only) at a second polarity, and the first polarity and the second polarity (in the series circuit) are directed opposite to one another.

In this assembly, it is advantageous that the multilevel converter requires only submodules that are able to connect the electrical energy storage unit into the series circuit (only) at a single polarity (for example so-called half-bridge submodules). In particular, submodules that are able to connect the electrical energy storage unit into the series circuit at two different (opposite) polarities are not required. Such two-polarity submodules (for example so-called full-bridge submodules) have so far been used comparatively little for multilevel converters. As a result, the development and production costs for two-polarity submodules are comparatively high.

The submodules of the first group and the submodules of the second group ensure that voltages of the first polarity (for example positive voltages) as well as voltages of the second polarity (for example negative voltages) can be generated in each module branch. In particular, the current flowing through the multilevel converter can be controlled as a result. This allows reactive power to be provided for the power supply network or delivered to the power supply network in a controlled manner. The multilevel converter contains three module branches, so it is preferably of three-phase design.

Each of the submodules of the first group and each of the submodules of the second group each contains an electrical energy storage unit and two electronic switching elements. The submodules of the first group and the submodules of the second group are constructed in identical fashion. The term "first electronic switching element", "second electronic switching element", "third electronic switching element", etc. is only used therefore to be able to distinguish between the individual electronic switching elements. This should not mean that the submodules of the first group and the submodules of the second group comprise different electronic switching elements.

The assembly may be configured so that in the submodules, in each case the first electronic switching element and the second electronic switching element are arranged in a half-bridge circuit and/or the third electronic switching element and the fourth electronic switching element are arranged in a half-bridge circuit. A half-bridge circuit is sufficient to connect a single-polarity voltage into the series circuit.

The assembly may be configured so that:

in at least one module branch, in each case one submodule of the first group and one submodule of the second group form a double submodule in which, the first electronic switching element, the second electronic switching element, the third electronic switching element and the fourth electronic switching element are arranged (interconnected) so that, the first electrical energy storage unit of the double submodule can be connected into the series circuit (only) at the first polarity, and the second electrical energy storage unit of the double submodule can be connected into the series circuit (only) at the second polarity.

Advantageously, therefore, two half-bridge submodules are combined and form the double submodule.

The assembly may be configured so that in the double submodule, in each case the first electronic switching element and the second electronic switching element are arranged in a half-bridge circuit and the third electronic switching element and the fourth electronic switching element are arranged in a half-bridge circuit.

The assembly may be configured so that the electronic switching elements are each configured as an IGBT (Insulated-Gate Bipolar Transistor), IGCT (Integrated Gate-Commutated Thyristor), IEGT (Injection-Enhanced Gate Transistor) or MOSFET (Metal-Oxide-Semiconductor Field-Effect Transistor).

The assembly may also be configured so that:
the assembly contains a transformer having a first winding and a second winding,
the multilevel converter contains an AC voltage connection, and
the AC voltage connection is connected to the first winding of the transformer and the second winding of the transformer can be connected to a power supply network.

The assembly may be configured so that the AC voltage connection of the multilevel converter, the first winding of the transformer and/or the second winding of the transformer are of multiphase, in particular three-phase, design.

The assembly may be configured so that:
the multilevel converter contains six partial branches, each partial branch having a subset of the submodules of the multilevel converter in an (electrical) series circuit (so that the submodules of the multilevel converter are divided among the six partial branches),
the six partial branches are arranged mechanically as in a B6 bridge circuit, and
the six partial branches are electrically interconnected in such a way that two partial branches each form one of the module branches (whereby the module branches are electrically arranged in the delta circuit).

This advantageously allows the multilevel converter to be constructed in the same way as in the case of a known B6 bridge circuit, which can save development costs.

The assembly may be configured so that each partial branch contains either the first group of the submodules of one of the module branches or the second group of the submodules of one of the module branches.

Therefore, each partial branch can provide and/or output a voltage at only one polarity.

Also disclosed is a method for outputting reactive power to a power supply network, in which reactive power is generated by a multilevel converter and delivered to a power supply network, wherein:
the multilevel converter contains three module branches arranged in a delta circuit,
each module branch contains a plurality of submodules in an electrical series circuit,
each module branch contains a first group of the submodules and a second group of the submodules, wherein,
the submodules of the first group each comprise a first (unipolar) electrical energy storage unit, a first electronic switching element and a second electronic switching element, wherein the first electronic switching element and the second electronic switching element are arranged so that the first electrical energy storage unit can be connected into the series circuit (only) at a first polarity,
the submodules of the second group each comprise a second (unipolar) electrical energy storage unit, a third electronic switching element and a fourth electronic switching element, wherein the third electronic switching element and the fourth electronic switching element are arranged so that the second electrical energy storage unit can be connected into the series circuit (only) at a second polarity, and
the first polarity and the second polarity (in the series circuit) are directed opposite to one another.

The method may be carried out so that:
a voltage of the first electrical energy storage unit (only) at the first polarity is output into the series circuit by the submodules of the first group, and a voltage of the second electrical energy storage unit (only) at the second polarity is output into the series circuit by the submodules of the second group.

The method may also be carried out so that in at least one of the module branches, in particular in each of the module branches, a time-variable voltage which has the first polarity at times and the second polarity at times is generated by interaction of the submodules of the first group of the module branch and the submodules of the second group of the module branch.

The method may be configured so that in the submodules, in each case the first electronic switching element and the second electronic switching element are arranged in a half-bridge circuit and/or the third electronic switching element and the fourth electronic switching element are arranged in a half-bridge circuit.

The method may be configured so that:
in at least one module branch, in each case one submodule of the first group and one submodule of the second group form a double submodule in which,
the first electronic switching element, the second electronic switching element, the third electronic switching element and the fourth electronic switching element are arranged (interconnected) so that,
the first electrical energy storage unit of the double submodule can be connected into the series circuit (only) at the first polarity, and
the second electrical energy storage unit of the double submodule can be connected into the series circuit (only) at the second polarity.

In the double submodule, in each case the first electronic switching element and the second electronic switching element can be arranged in a half-bridge circuit and the third electronic switching element and the fourth electronic switching element can be arranged in a half-bridge circuit.

The assembly and the method have identical or similar properties and/or advantages.

Other features which are considered as characteristic for the invention are set forth in the appended claims.

Although the invention is illustrated and described herein as embodied in an assembly having a multilevel converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Identical reference signs in this case refer to identical or functionally identical elements.

DETAILED DESCRIPTION OF THE INVENTION

Figure 1:
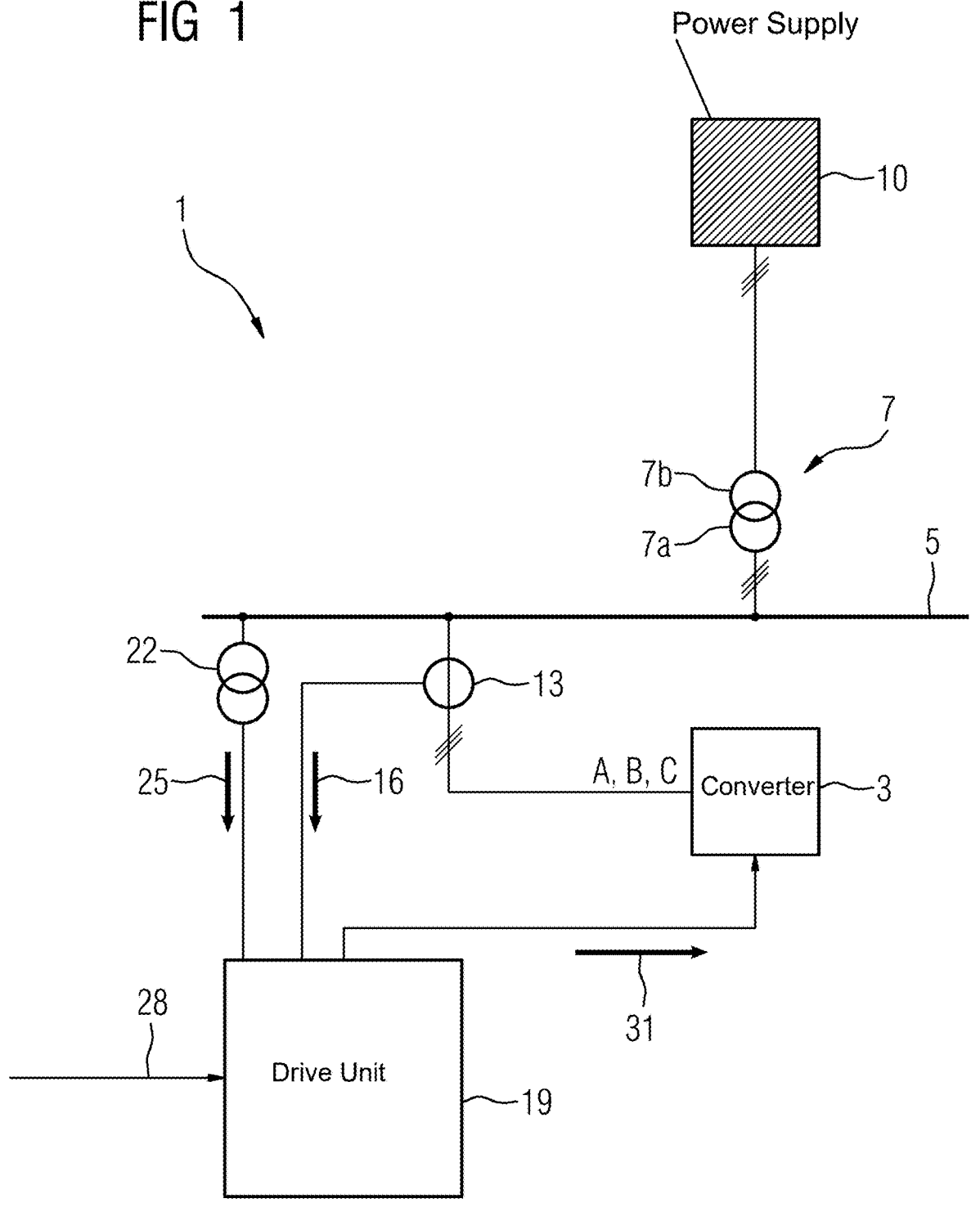
FIG. 1 is a block diagram of an exemplary embodiment of an assembly having a modular multilevel converter according to the invention.

Referring now to the figures of the drawings in detail and first, particularly to FIG. 1 thereof, there is shown an assembly 1 having a modular multilevel converter 3 (modular multistage converter 3). The modular multilevel converter 3 has a three-phase AC voltage connection A, B, C. The modular multilevel converter 3 is electrically connected in a three-phase manner via the three-phase AC voltage connection A, B, C thereof to a power supply network 10 via a connection rail 5 and a three-phase transformer 7. In this case, the AC voltage connection A, B, C of the multilevel converter 3 is electrically connected in a three-phase manner to a first three-phase winding 7a of the transformer; a second three-phase winding 7b of the transformer is or can be electrically connected in a three-phase manner to the power supply network 10. In the exemplary embodiment, the power supply network 10 is a three-phase AC power supply network 10.

The current flowing through the converter 3 is measured by means of a current sensor 13. Current measurement values 16 are transmitted to a drive unit 19 for the modular multilevel converter 3. Furthermore, the voltage applied across the connection rail 5 is measured by means of a voltage sensor 22 (which is implemented here as a measuring transformer 22). This voltage substantially corresponds to the voltage present across the modular multilevel converter 3. Voltage measurement values 25 are transmitted to the drive unit 19. The drive unit 19 compares the current measurement values 16 and the voltage measurement values 25 with predefined setpoint values 28. The drive unit then calculates drive signals 31, which are transmitted to the modular multilevel converter 3. The multilevel converter 3 is driven by means of these drive signals 31 in such a way that the desired current values and voltage values are set across the connection rail 5. In other words, the drive unit 19 controls the multilevel converter 3. In such an assembly, the modular multilevel converter 3 may be used, for example, for reactive power generation or reactive power compensation.

Figure 2:
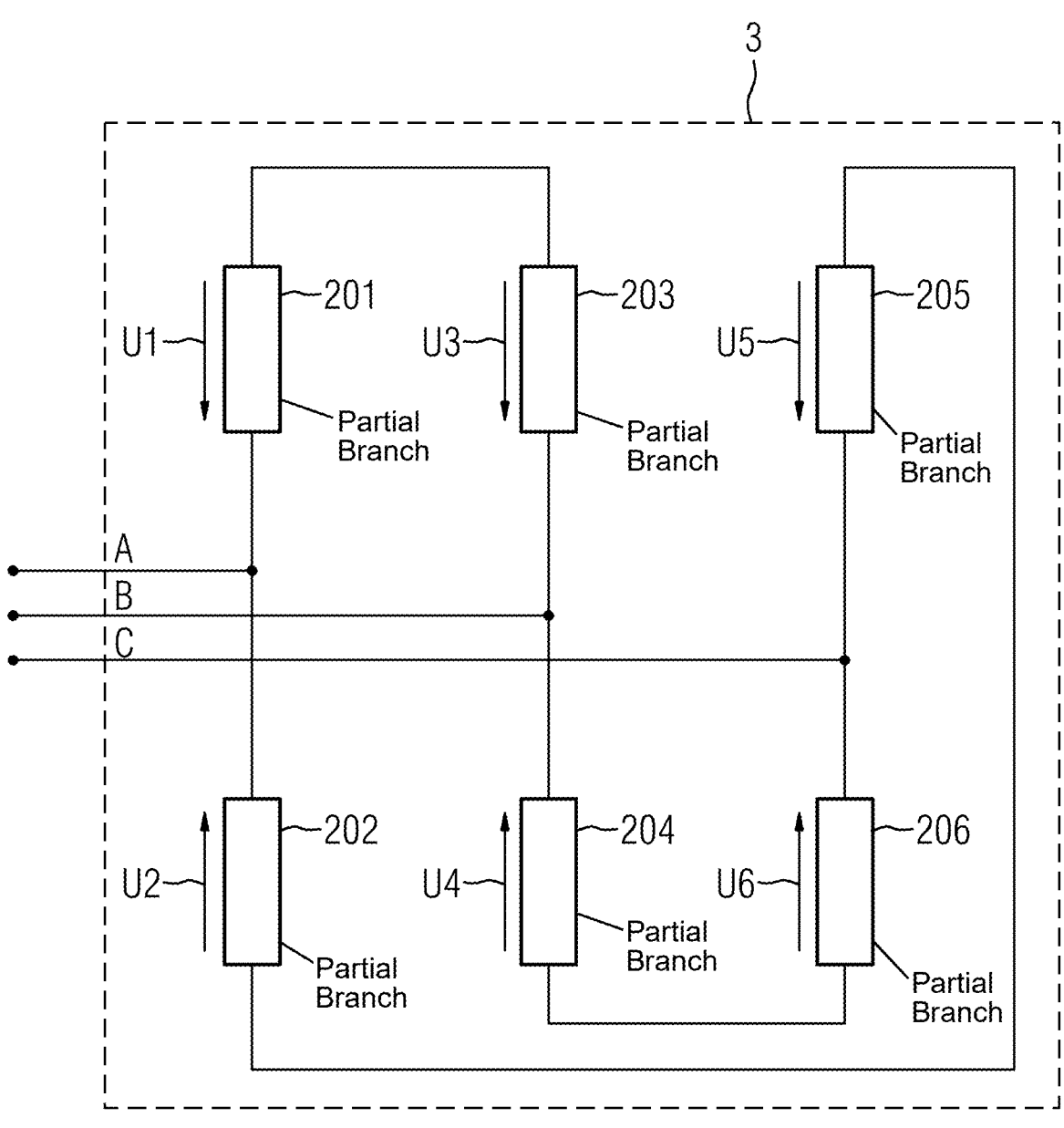
FIG. 2 is a block diagram of an exemplary embodiment of the multilevel converter having six partial branches forming three module branches in an electrical delta circuit.

FIG. 2 illustrates an exemplary embodiment of the multilevel converter 3 which has six partial branches 201 to 206. These six partial branches 201 to 206 are electrically connected in a delta circuit. The six partial branches 201 to 206 are therefore electrically interconnected in such a way that a delta circuit is formed. The six partial branches 201 to 206 are arranged in series in a ring structure, wherein each one of the three phases of the AC voltage connection A, B, C is arranged or connected downstream of two partial branches.

Figure 5:
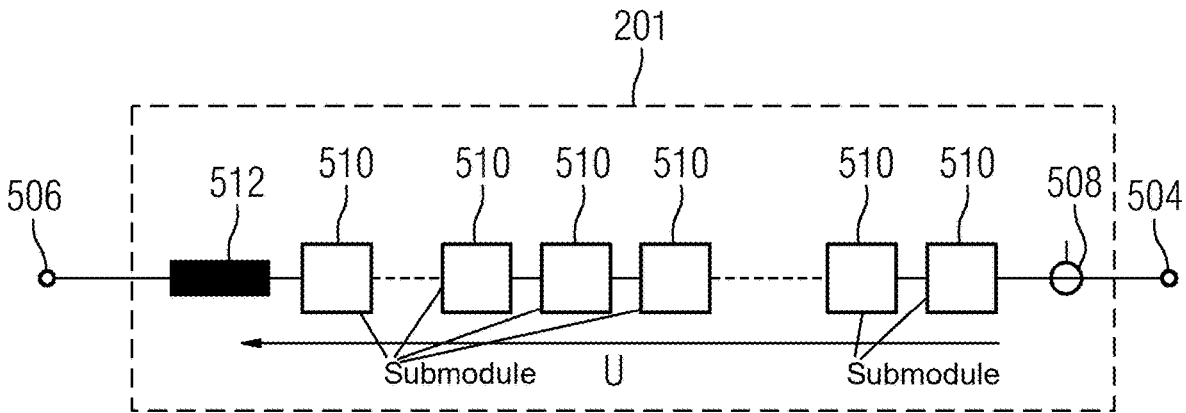
FIG. 5 is a block diagram of an exemplary embodiment of a partial branch of the multilevel converter.

The three-phase AC voltage connection A, B, C of the multilevel converter 3 is connected (as shown in FIG. 1) to three phases of the power supply network 10. The structure of the partial branches 201 to 206 is illustrated in FIG. 5.

A respective voltage arrow U is arranged on each of the partial branches 201 to 206, the voltage arrow indicating the polarity of the electrical voltage that can be provided by the respective partial branch.

Figure 3:
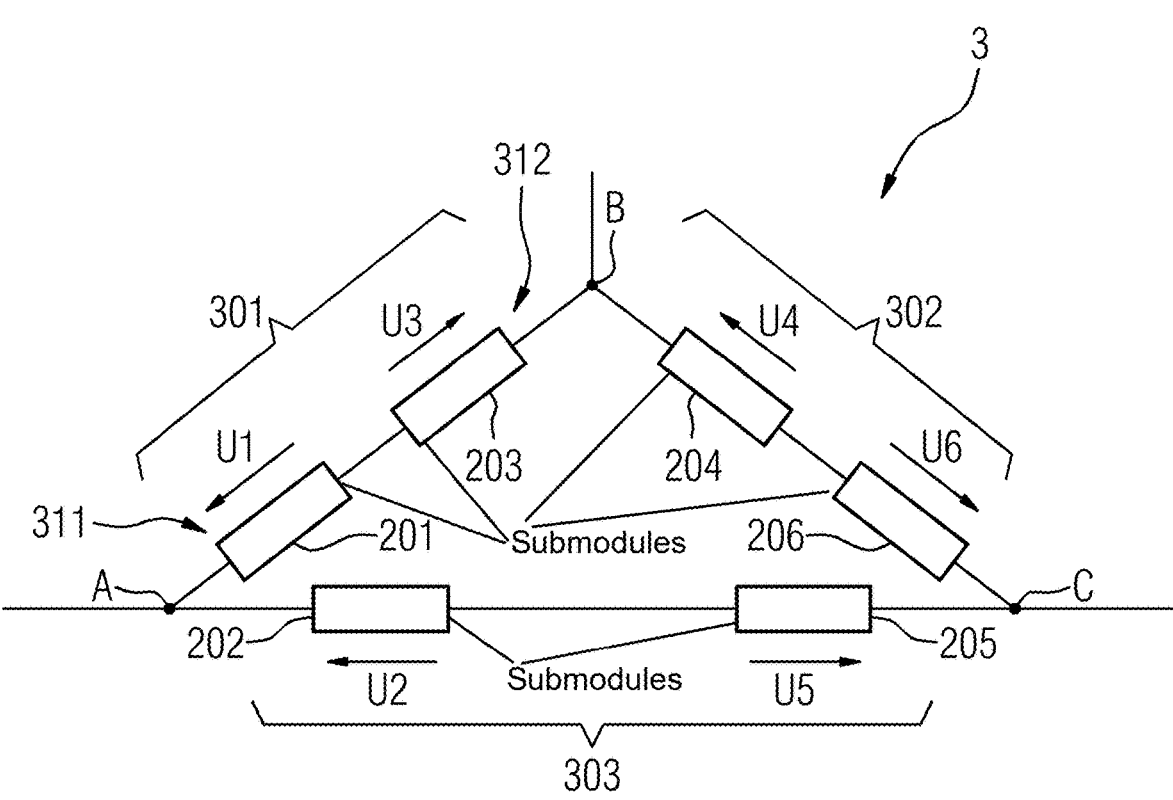
FIG. 3 is a block diagram of the exemplary embodiment of the multilevel converter from FIG. 2 in another illustration.

FIG. 3 shows the multilevel converter 3 from FIG. 2 in another illustration. In this illustration, it can be seen more clearly that the six partial branches 201 to 206 of the multilevel converter 3 are arranged electrically in a delta circuit. The first partial branch 201 and the third partial branch 203 form the first module branch 301. The fourth partial branch 204 and the sixth partial branch 206 form the second module branch 302. The second partial branch 202 and the fifth partial branch 205 form the third module branch 303.

In the example, the first partial branch 201 contains the submodules of a first group 311, and the third partial branch 203 contains the submodules of a second group 312. The voltage arrow U1 of the first partial branch 201 is directed opposite to the voltage arrow U3 of the third partial branch 203. Therefore, the voltage U1 that is or can be output by the first partial branch 201 has a polarity that is directed opposite to the polarity of the voltage U3 that is or can be output by the third partial branch 203. This also applies in a similar manner to the fourth partial branch 204 and the sixth partial branch 206 and to the second partial branch 202 and the fifth partial branch 205, respectively.

Each module branch thus contains submodules with one polarity and submodules with the opposite polarity. If the number of submodules of one polarity (that is to say, for example, the submodules of the first group 311) is equal to the number of submodules of the opposite polarity (that is to say, for example, the submodules of the second group 312), then the respective module branch comprises pairs of oppositely polarized submodules. In particular, the multilevel converter 3 contains pairs of submodules connected back-to-back, in particular pairs of half-bridge submodules connected back-to-back.

During operation of the multilevel converter 3, in the first module branch 301, a time-variable voltage which has the first polarity (voltage U1) at times and the second polarity (voltage U3) at times is generated by interaction of the submodules 510 of the first group 311 of the first module branch 301 and the submodules 510 of the second group 312 of the first module branch 301. The first module branch 301 can thus generate or output a time-variable voltage of changing polarity, for example an (approximately sinusoidal) AC voltage. This means that a reactive power can be generated by means of the multilevel converter 3 and output to the power supply network 10.

Figure 4:
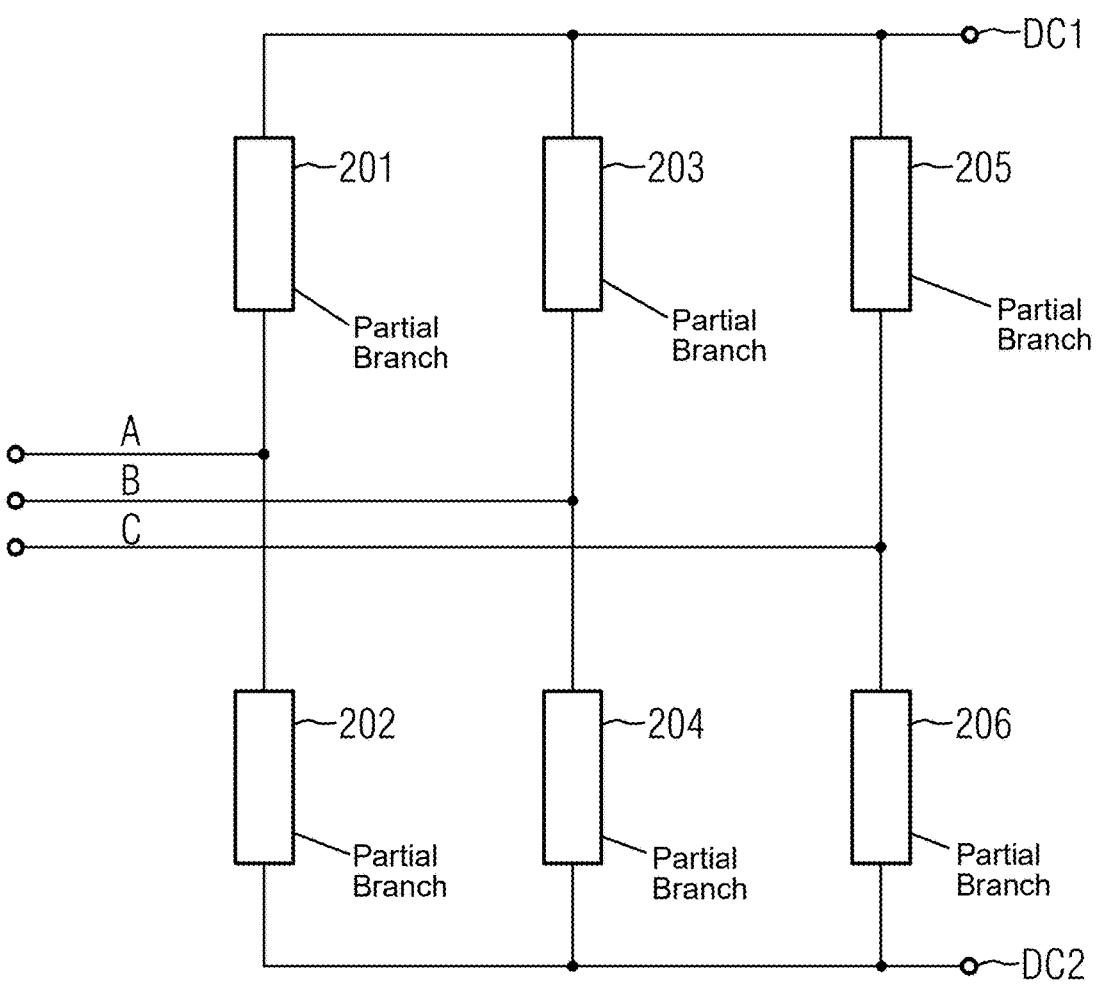
FIG. 4 is a block diagram of an exemplary embodiment of an unclaimed multilevel converter in a B6 bridge circuit.

FIG. 4 shows an unclaimed exemplary embodiment of another multilevel converter in a B6 bridge circuit. The six partial branches 201 to 206 are arranged in a bridge circuit. In this case, a respective connection of two partial branches are electrically connected to one another and form a phase of the AC voltage connection A, B, C.

The other connection of three partial branches is connected to a first DC voltage connection DC1 (for example, a positive DC voltage connection); the other connection of the other three partial branches is connected to a second DC voltage connection DC2 (for example, a negative DC voltage connection).

When comparing FIGS. 2 and 4, it is easy to see that, in the case of the multilevel converter 3 according to FIG. 2, the six partial branches 201 to 206 are arranged mechanically as in the B6 bridge circuit according to FIG. 4. However, in the case of the multilevel converter 3 according to FIG. 2, the six partial branches 201 to 206 are electrically interconnected in such a way that two respective partial branches form one of the module branches and the module branches are electrically arranged in the delta circuit. The six partial branches 201 to 206 thus form the electrical delta circuit.

If, for example, a converter has already been developed for high-voltage direct current transmission in a B6 bridge circuit with a tower structure (converter tower), then the already known tower structure can advantageously be reused for a converter that is to be redeveloped for reactive power generation, where the individual partial branches only need to be interconnected differently. This can significantly reduce development costs.

FIG. 5 illustrates an exemplary embodiment of the first partial branch 201 in more detail. The other partial branches 202 to 206 are constructed in the same fashion. The first partial branch 201 comprises a first connection 504 (first partial branch connection 504) and a second connection 506 (second partial branch connection 506). The first connection 504 is electrically connected to a first submodule 510 via a current sensor 508. The first submodule 510 is electrically connected in series with other submodules 510; in total, the first partial branch 201 comprises n submodules 510. The last of the n submodules 510 is electrically connected to the second connection 506 via a coupling inductance 512. The current flowing through the first partial branch 201 is measured by means of the current sensor 508. The arrow U (voltage arrow U) indicates the direction of the polarity of the voltage that can be output by the first partial branch 201. Each partial branch can output a voltage at a first polarity or at a second polarity (which is opposite to the first polarity). If a partial branch comprises double submodules, then this partial branch can output a voltage at a first polarity and alternatively also a voltage at the second polarity. Such arrows U are also indicated in FIGS. 2 and 3.

Figure 6:
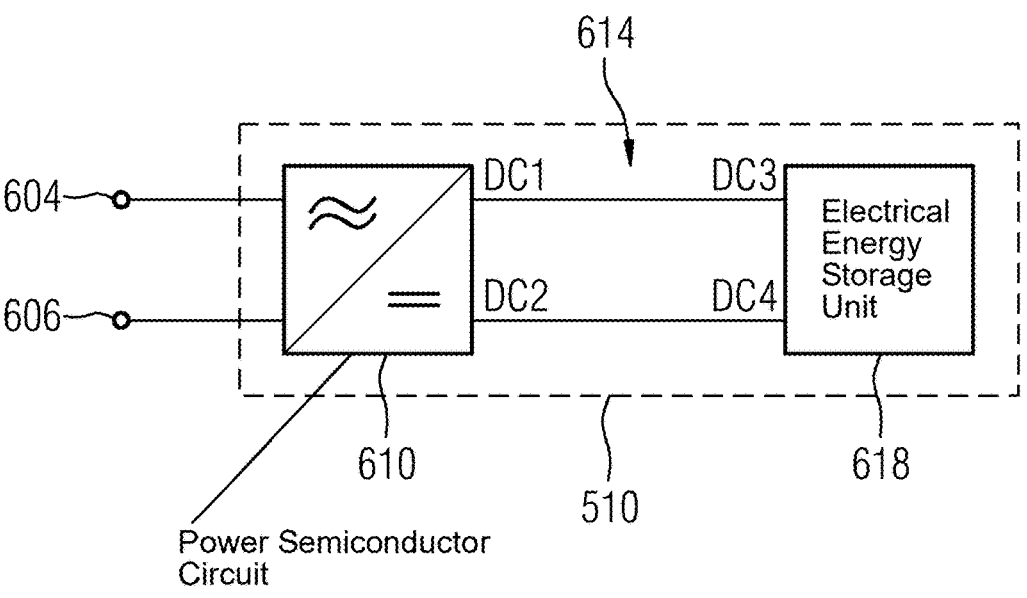
FIG. 6 is a block diagram of an exemplary embodiment of a submodule of the multilevel converter.

FIG. 6 illustrates an exemplary embodiment of the submodule 510 in detail. The two-pole submodule 510 contains a first submodule connection 604 and a second submodule connection 606. The two submodule connections 604 and 606 are connected to a power semiconductor circuit 610 (more precisely to an AC voltage connection of the power semiconductor circuit 610). A DC voltage connection DC1, DC2 of the power semiconductor circuit 610 is connected to a DC voltage connection DC3, DC4 of an electrical energy storage unit 618 via a DC link 614. The electrical energy storage unit 618 may comprise, for example, a capacitor; the energy storage unit 618 may thus be designed, for example, as a capacitor module.

Figure 7:
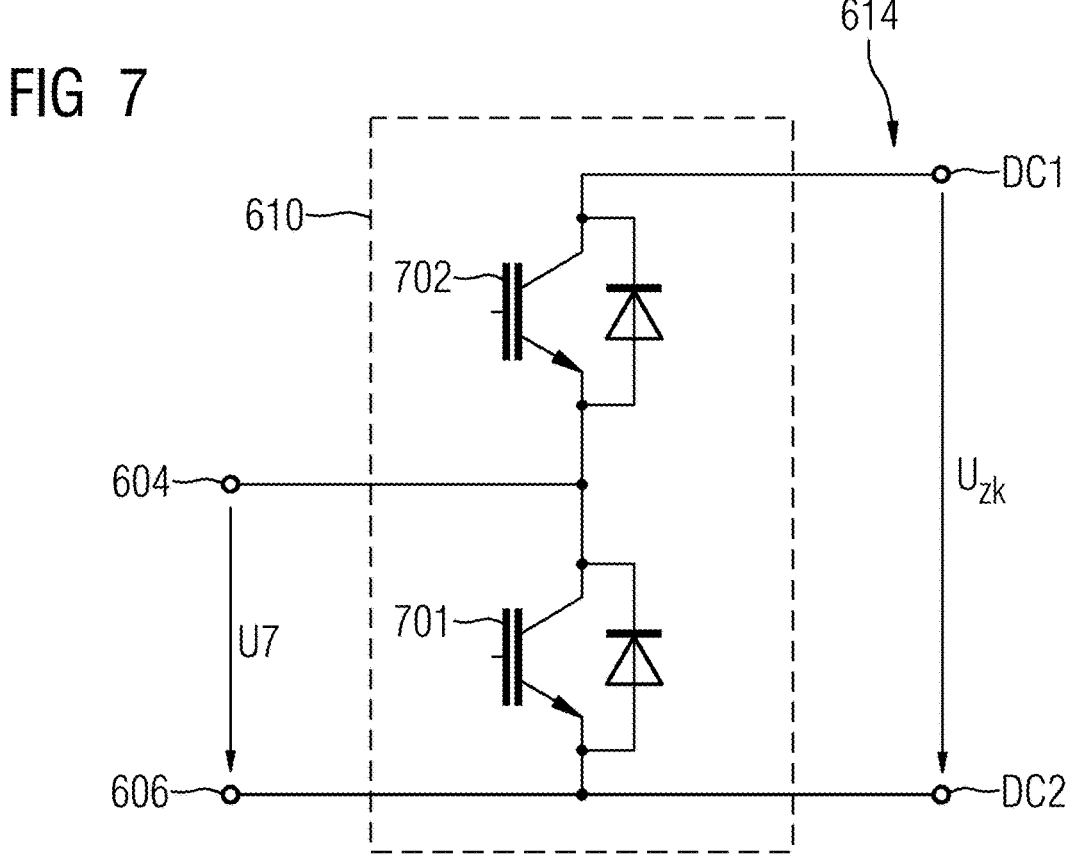
FIG. 7 is a schematic diagram of an exemplary embodiment of a power semiconductor circuit of the submodule.

FIG. 7 illustrates an exemplary embodiment of the power semiconductor circuit 610. The power semiconductor circuit 610 may also be referred to as a power module. The power semiconductor circuit 610 comprises a first electronic switching element 701 and a second electronic switching element 702. The first electronic switching element 701 and the second electronic switching element 702 are each configured as an electronic switching element that can be switched on and off, in particular as a power electronic switching element that can be switched on and off.

Each of the electronic switching elements 701, 702 contains a power semiconductor component with a diode connected in anti-parallel. In the exemplary embodiment of FIG. 7, the power semiconductor component is an IGBT (Insulated-Gate Bipolar Transistor). In other exemplary embodiments, however, the power semiconductor component can also be configured differently, for example as an IGCT (Integrated Gate-Commutated Thyristor), IEGT (Injection-Enhanced Gate Transistor) or as a MOSFET (Metal- Oxide-Semiconductor Field-Effect Transistor). In the exemplary embodiment of FIG. 7, the two electronic switching elements 701 and 702 form a half-bridge circuit. The submodule is therefore a half-bridge submodule. A voltage at a single polarity (or zero volts), as symbolized by the voltage arrow U7, can be output between the first submodule connection 604 and the second submodule connection 606. A DC link voltage, which is symbolized by a voltage arrow Uzk, occurs at the DC link 614.

Surprisingly, only a part (for example half) of the half-bridge submodules of a module branch is active per current half-wave, for example the half-bridge submodules of the first group. The other part (for example the other half) of the half-bridge submodules (for example the half-bridge submodules of the second group) is bypassed during the current half-wave by the anti-parallel diode (reverse diode) of the respective first electronic switching element 701. This reduces (in particular halves) the effective current load on the energy storage unit of the respective half-bridge submodule.

Figure 8:
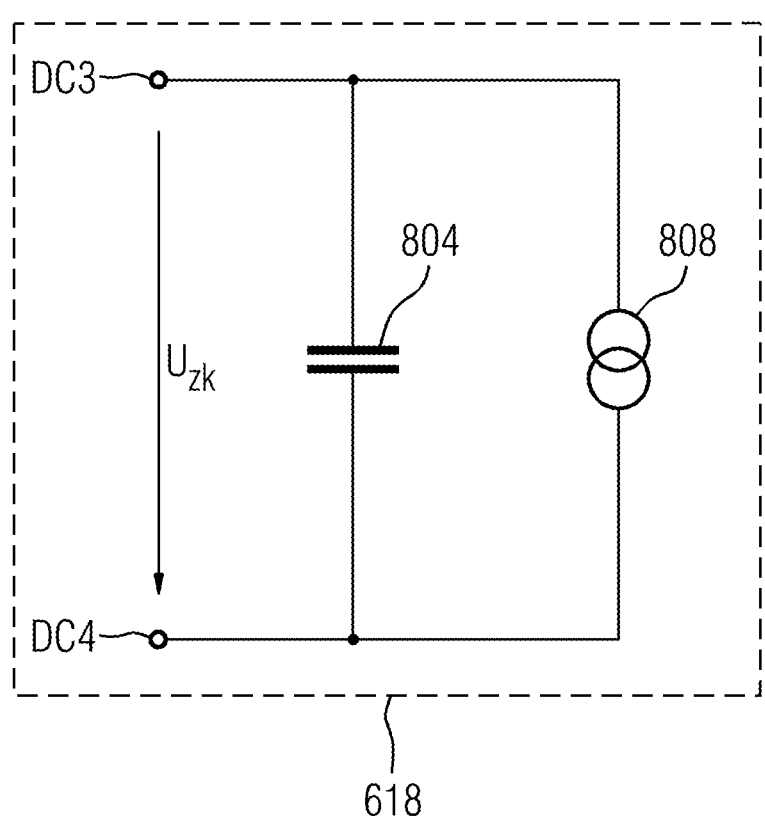
FIG. 8 is a schematic diagram of an exemplary embodiment of an energy storage unit of the submodule.

FIG. 8 shows an exemplary embodiment of the energy storage unit 618. The energy storage unit 618 has a capacitor 804. The capacitor 804 buffer-stores the DC link voltage Uzk. A voltage measuring device 808 is connected in parallel with the capacitor 804.

FIGS. 6 to 8 thus illustrate a half-bridge submodule, more precisely a half-bridge submodule of the first group of submodules. A half-bridge submodule of the second group of submodules is constructed in the same fashion. Such a submodule thus comprises in each case at least one unipolar electrical energy storage unit and two electronic switching elements.

Figure 9:
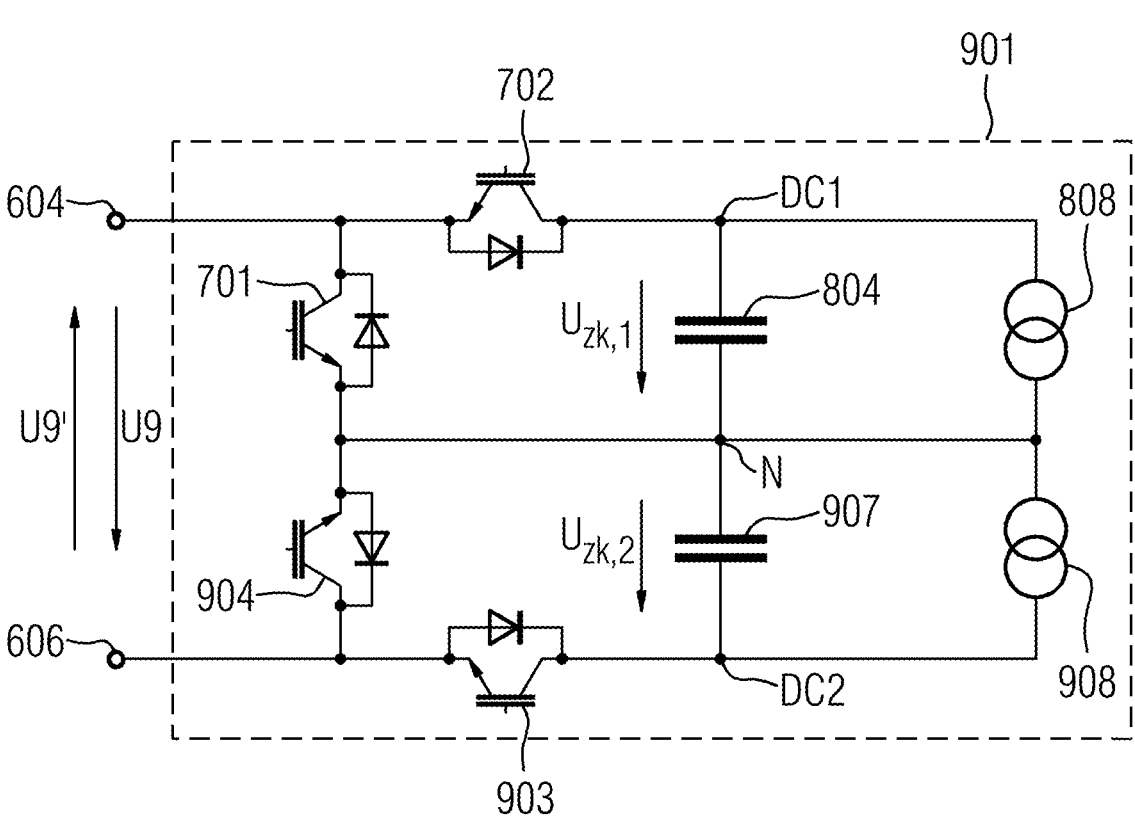
FIG. 9 is a schematic diagram of an exemplary embodiment of a double submodule.

FIG. 9 illustrates an exemplary embodiment of a double submodule 901. In addition to the first electronic switching element 701 and the second electronic switching element 702, the double submodule 901 contains a third electronic switching element 903 and a fourth electronic switching element 904. The first electronic switching element 701 and the second electronic switching element 702 are arranged in a first half-bridge circuit; the third electronic switching element 903 and the fourth electronic switching element 904 are arranged in a second half-bridge circuit.

In addition to the first energy storage unit in the form of the first capacitor 804 and to the first voltage measuring device 808, the double submodule 901 comprises a second energy storage unit in the form of a second capacitor 907 and a second voltage measuring device 908. The double submodule 901 also comprises two DC link circuits with a first DC link voltage Uzk, 1 and a second DC link voltage Uzk,2, respectively. The connecting point between the first energy storage unit 804 and the second energy storage unit 907 forms the common ground connection N of the double submodule 901.

The first electronic switching element 701, the second electronic switching element 702, the third electronic switching element 903 and the fourth electronic switching element 904 are arranged in such a way that the voltage of the first electrical energy storage unit 804 can be output (only) at the first polarity U9 between the first submodule connection 604 and the second submodule connection 606, and that the voltage of the second electrical energy storage unit 907 can be output (only) at the second polarity U9' between the first submodule connection 604 and the second submodule connection 606. The first polarity U9 is in this case opposite to the second polarity U9'. This is symbolized by the two voltage arrows U9 and U9' between the first submodule connection 604 and the second submodule connection 606.

The double submodule 901 thus has two half-bridge circuits; it may also be referred to as a double half-bridge submodule 901. The double submodule 901 comprises a half-bridge submodule of the first group of submodules and a half-bridge submodule of the second group of submodules; the double submodule 901 thus combines a half-bridge submodule of the first group of submodules and a half-bridge submodule of the second group of submodules.

An assembly having a multilevel converter for outputting reactive power to a power supply network and a method for outputting reactive power to a power supply network have been described. In particular, half-bridge submodules are used in this case; full-bridge submodules are advantageously not necessary (the multilevel converter is completely devoid of full bridges). Since half-bridge submodules are currently used in far greater numbers than full-bridge submodules (for example in converters for high-voltage direct current transmission), half-bridge submodules are more cost-effective than full-bridge submodules. In addition, there are logistical advantages when half-bridge submodules can be used as the same parts for other converters. For example, half-bridge submodules can advantageously be used in converters for reactive power generation and in converters for high-voltage direct current transmission.

The following is a summary list of reference numerals and the corresponding structure used in the above description of the invention:

1 Assembly
3 Modular multilevel converter
5 Connection rail
7 Transformer
7a First winding
7b Second winding
10 Power supply network
13 Current sensor
16 Current measurement values
19 Drive unit
22 Voltage sensor
25 Voltage measurement values
28 Setpoint values
31 Drive signals
201 First partial branch
202 Second partial branch
203 Third partial branch
204 Fourth partial branch
205 Fifth partial branch
206 Sixth partial branch
301 First module branch
302 Second module branch
303 Third module branch
311 First group of submodules
312 Second group of submodules
504 First connection
506 Second connection
508 Current sensor
510 Submodule
512 Coupling inductance
604 First submodule connection
606 Second submodule connection
610 Power semiconductor circuit
614 DC link
618 Energy storage unit
701 First electronic switching element
702 Second electronic switching element 804 First capacitor
808 First voltage measuring device
901 Double submodule
903 Third electronic switching element
904 Fourth electronic switching element
907 Second capacitor
908 Second voltage measuring device
A, B, C AC voltage connection
U Voltage arrow
U1 First voltage arrow
U2 Second voltage arrow
U3 Third voltage arrow
U4 Fourth voltage arrow
U5 Fifth voltage arrow
U6 Sixth voltage arrow
U7, U7' Voltage arrows
U9, U9' Voltage arrows
Uzk DC link voltage
Uzk,1 First DC link voltage
Uzk,2 Second DC link voltage
N Ground connection
DC1, DC2 DC voltage connection
DC3, DC4 DC voltage connection

The invention claimed is:

1. An assembly, comprising:
a multilevel converter outputting reactive power to a power supply network, said multilevel converter having three module branches disposed in a delta circuit, each of said module branches having a plurality of submodules in an electrical series circuit, each of said module branches having a first group of said submodules and a second group of said submodules, wherein:
said submodules of said first group each contain a first electrical energy storage unit, a first electronic switching element and a second electronic switching element, wherein said first electronic switching element and said second electronic switching element are disposed so that said first electrical energy storage unit is connected into said electrical series circuit at a first polarity;
said submodules of said second group each contain a second electrical energy storage unit, a third electronic switching element and a fourth electronic switching element, wherein said third electronic switching element and said fourth electronic switching element are disposed so that said second electrical energy storage unit can be connected into said electrical series circuit at a second polarity; and
the first polarity and the second polarity are directed opposite to one another.

2. The assembly according to claim 1, wherein in said submodules, in each case said first electronic switching element and said second electronic switching element are disposed in a half-bridge circuit or said third electronic switching element and said fourth electronic switching element are disposed in a half-bridge circuit.

3. The assembly according to claim 1, wherein:
in at least one of said module branches, in each case one of said submodules of said first group and one of said submodules of said second group form a double submodule in which said double submodule:
said first electronic switching element, said second electronic switching element, said third electronic switching element and said fourth electronic switching element are disposed so that said first electrical energy storage unit of said double submodule is connected into said electrical series circuit at the first polarity; and said second electrical energy storage unit of said double submodule is connected into said electrical series circuit at the second polarity.

4. The assembly according to claim 3, wherein in said double submodule, in each case said first electronic switching element and said second electronic switching element are disposed in a half-bridge circuit and said third electronic switching element and said fourth electronic switching element are disposed in a half-bridge circuit.

5. The assembly according to claim 3, wherein said first, said second, said third and said fourth electronic switching elements are each configured as an Insulated-Gate Bipolar Transistor, an Integrated Gate-Commutated Thyristor, an Injection-Enhanced Gate Transistor or a Metal-Oxide-Semiconductor Field-Effect Transistor.

6. The assembly according to claim 1, further comprising a transformer having a first winding and a second winding; and wherein said multilevel converter contains an AC voltage connection, said AC voltage connection is connected to said first winding of said transformer and said second winding of said transformer is connected to the power supply network.

7. The assembly according to claim 6, wherein said AC voltage connection of said multilevel converter, said first winding of said transformer and/or said second winding of said transformer are of a multiphase configuration.

8. The assembly according to claim 7, wherein said multiphase configuration is a three-phase configuration.

9. The assembly according to claim 1, wherein said multilevel converter has six partial branches, each of said partial branches having a subset of said submodules of said multilevel converter in a series circuit, said six partial branches are disposed mechanically as in a B6 bridge circuit, and said six partial branches are electrically interconnected such that two of said partial branches each form one of said module branches.

10. The assembly according to claim 9, wherein each of said partial branches contains either said first group of said submodules of one of said module branches or said second group of said submodules of one of said module branches.

11. A method for outputting reactive power to a power supply network, which comprises the steps of:

generating the reactive power via a multilevel converter, wherein the multilevel converter contains three module branches disposed in a delta circuit, each of the module branches contains a plurality of submodules in an electrical series circuit, each of the module branches contains a first group of the submodules and a second group of the submodules, wherein the submodules of the first group each contain a first electrical energy storage unit, a first electronic switching element and a second electronic switching element, wherein the first electronic switching element and the second electronic switching element are disposed so that the first electrical energy storage unit can be connected into the electrical series circuit at a first polarity, the submodules of the second group each contain a second electrical energy storage unit, a third electronic switching element and a fourth electronic switching element, wherein the third electronic switching element and the fourth electronic switching element are disposed so that the second electrical energy storage unit is connected into the electrical series circuit at a second polarity, and the first polarity and the second polarity are directed opposite to one another; and delivering the reactive power to the power supply network.

12. The method according to claim 11, wherein:

a voltage of the first electrical energy storage unit at the first polarity is output into the electrical series circuit by the submodules of the first group; and a voltage of the second electrical energy storage unit at the second polarity is output into the electrical series circuit by the submodules of the second group.

13. The method according to claim 11, wherein in at least one of the module branches a time-variable voltage which has the first polarity at times and the second polarity at times is generated by interaction of the submodules of the first group of the module branch and the submodules of the second group of the module branch.

14. The method according to claim 11, wherein in the submodules, in each case the first electronic switching element and the second electronic switching element are disposed in a half-bridge circuit or the third electronic switching element and the fourth electronic switching element are disposed in a half-bridge circuit.

15. The method according to claim 11, wherein:

in at least one the module branches, in each case one of the submodules of the first group and one of the submodules of the second group form a double submodule in which:

the first electronic switching element, the second electronic switching element, the third electronic switching element and the fourth electronic switching element are disposed so that the first electrical energy storage unit of the double submodule can be connected into the electrical series circuit at the first polarity; and the second electrical energy storage unit of the double submodule is connected into the electrical series circuit at the second polarity.

16. The method according to claim 15, wherein in the double submodule, in each case the first electronic switching element and the second electronic switching element are disposed in a half-bridge circuit and the third electronic switching element and the fourth electronic switching element are disposed in a half-bridge circuit.

17. The method according to claim 11, wherein in each of the module branches a time-variable voltage which has the first polarity at times and the second polarity at times is generated by interaction of the submodules of the first group of the module branch and the submodules of the second group of the module branch.

* * * * *